H. W. SHONNARD.
SEPARABLE TORPEDO CONSTRUCTION.
APPLICATION FILED FEB. 28, 1917.
1,250,235.
Patented Dec. 18, 1917.
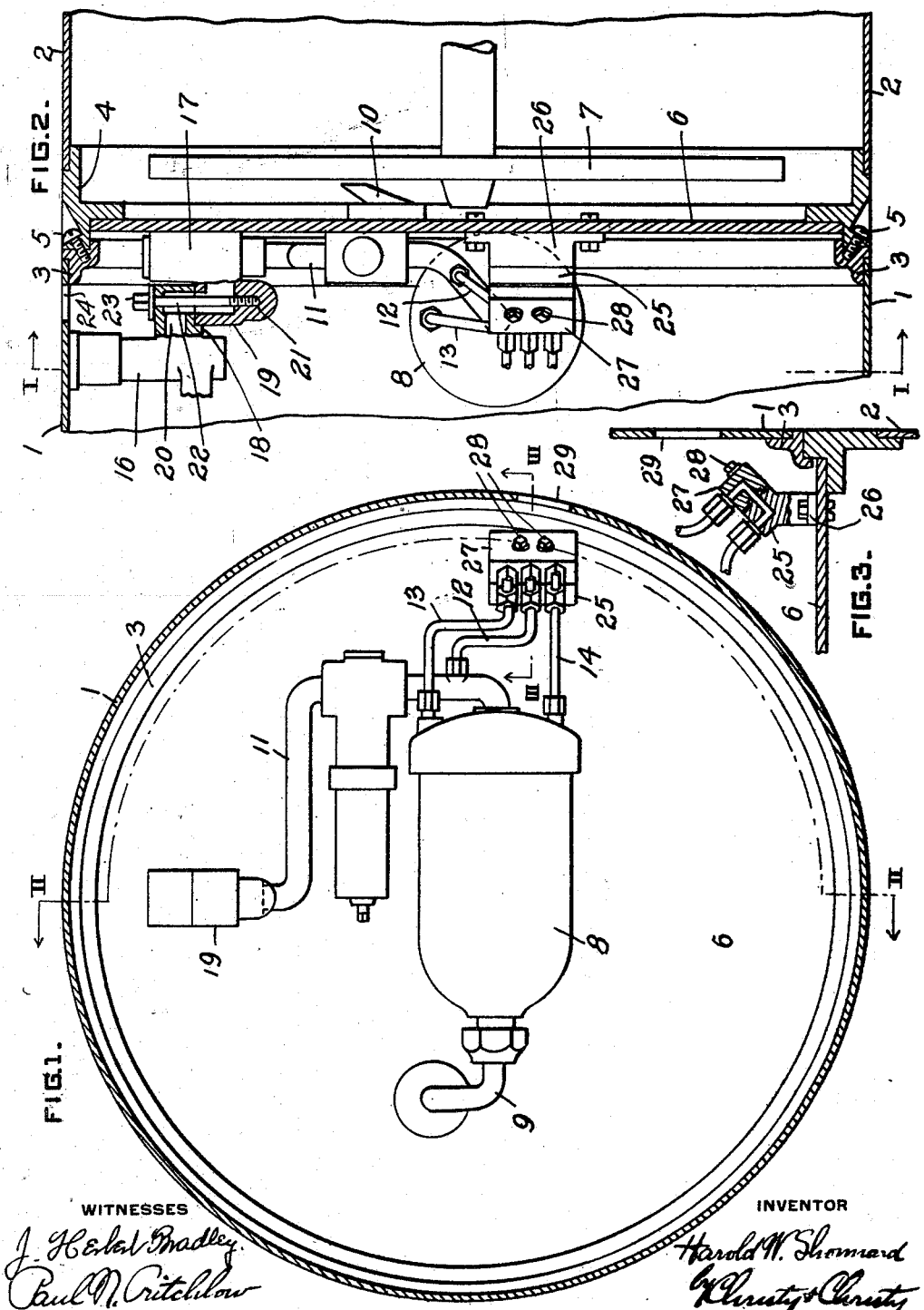

UNITED STATES PATENT OFFICE.

HAROLD W. SHONNARD, OF UPPER MONTCLAIR, NEW JERSEY, ASSIGNOR TO CRUCIBLE STEEL COMPANY OF AMERICA, OF PITTSBURGH, PENNSYLVANIA, A CORPORATION OF NEW JERSEY.

SEPARABLE-TORPEDO CONSTRUCTION.

1,250,235.  Specification of Letters Patent.  Patented Dec. 18, 1917.

Application filed February 28, 1917. Serial No. 151,549.

*To all whom it may concern:*

Be it known that I, HAROLD W. SHONNARD, residing at Upper Montclair, in the county of Essex and State of New Jersey, a citizen of the United States, have invented or discovered certain new and useful Improvements in Separable-Torpedo Construction, Case A, of which improvements the following is a specification.

In the manufacture of automobile torpedoes it is the usual practice to construct the casing or shell of a plurality of sections joined together in transverse planes in such a manner that they may be readily separated for whatever purpose desired. When, through the general plane of such a joint, a fluid conduit passes within the torpedo from one shell section to another, it becomes necessary to divide the conduit into two parts, one being carried by each shell section. Heretofore ordinary union couplings have been used for connecting these conduit parts. To make or break the coupling, it has been necessary to insert a pipe-wrench or other suitable tool through an opening in the shell, and, having engaged the coupling collar by the tool, oscillate the tool until the collar has been sufficiently rotated in one direction or the other. Because of the limitations placed upon the size of the shell opening for the tool (the shell being unduly weakened by a large opening), the permissible range of oscillation of the tool has been very small, so small in fact that a very considerable period of time is required to make or break the coupling.

In view of the foregoing considerations, it is the object of my invention to provide an automobile torpedo wherein the conduit coupling or couplings at a point of separation of shell parts may be quickly and easily made or broken.

In the accompanying sheet of drawings, which form part of my specification, I have illustrated the preferred embodiment of my invention. Figure 1 is a transverse section of an automobile torpedo taken on the line I I, Fig. 2; Fig. 2 a longitudinal sectional view of a portion of the torpedo, the plane of view being taken on the broken line II—II, Fig. 1; and Fig. 3 a detached sectional view to enlarged scale taken on the line III—III, Fig. 1.

While my invention broadly contemplates any separable joint in the shell of a torpedo, provided only that at such joint a fluid conduit passes from one to the other of the adjoining shell sections, it is particularly applicable to the joint between the turbine compartment and the compartment immediately fore thereof, and is so illustrated in the drawings. In the usual construction of torpedoes the last mentioned compartment contains the motive fluid generator and the various essential conduits and valves for conducting and regulating the flow of various fluids (usually air, water and alcohol) from their sources of supply to such generator.

Referring to the illustrative embodiment of my invention, portions of fore and aft shell sections are indicated at 1 and 2, respectively, their adjoining ends being provided with collars 3 and 4, adapted to be detachably connected to each other by bolts 5, and acting also as reinforcing flanges. The aft section 2 is provided with a bulkhead 6 which separates the interior of the torpedo into a turbine compartment in which a turbine 7 is placed, and an open-to-the-sea compartment in which is placed the motive fluid generator 8 and the various conduits leading thereto. For various practical reasons it is desirable to attach the motive fluid generator to the turbine-containing section of the torpedo. As shown herein it is attached to the bulkhead 6, the outlet conduit 9 extending from the generator through the bulkhead and terminating with a turbine nozzle 10.

In making or breaking the connection between the fore and aft shell sections 1 and 2, it is necessary, when the generator is carried by the section 2 as just explained, to make or break connections in all the conduits leading to the heater. These conduits, as shown herein, are the main air supply conduit 11, and the smaller conduits 12, 13, and 14 which may correspond in function to the conduits 26, 36 and 37 fully shown and described in my U. S. Letters Patent No. 1,207,333. It is through the several conduits leading to and from the heater that the heater is preferably attached to the bulkhead.

The connections which I provide for these conduits are characterized by the fact that the conduit coupling members are attached to each other by a rotatable member provided with a head which is engageable for continuous and uninterrupted rotation by a wrench or other suitable tool inserted through a suitably provided hole in the shell section 1.

While the couplings may be made at various points in the several conduits, the break in the main air supply conduit 11 is preferably made between the flask-filling valve 16 and the starting valves 17, the former being carried by the shell section 1 and the latter by the bulkhead 6. For this purpose these valves are provided with laterally projecting coupling members 18 and 19 which meet in a plane substantially parallel to the longitudinal axis of the torpedo, and which form a fluid passageway between the valves. These members are provided with openings 20 and 21 the latter of which is threaded to receive a bolt 22 provided with a head 23, adapted to be engaged for continuous rotation by a tool inserted through an opening 24 in the shell adjacent to such head.

A single connection is preferably provided for the conduits 12, 13 and 14. As shown in the drawings, the parts of such conduits adjacent to the generator 8 are attached to a coupling head 25 forming part of a bracket 26 attached to the bulkhead 6. The other parts of these conduits, that is to say the parts carried by the shell section 1 are attached to a coupling head 27 adapted to be attached to the coöperating head 25 by a plurality of bolts 28 substantially the same as the bolt 22, 23 already explained. It will be observed of the heads of the bolts 28 that they too are adjacent to an opening 29 in the shell section 1, and are also accessible for continuous rotation.

By reason of the construction and arrangement of the conduits and their couplings as shown and described, the connecting or disconnecting of the torpedo sections is greatly facilitated, and furthermore the manufacture of the essential air controlling valves may be greatly simplified.

According to the provisions of the patent statutes, I have described the principle and operation of my invention together with construction which I now consider to represent the best embodiment thereof. However, I desire to have it understood that my invention may be practised by other forms of construction than that specifically shown and described.

I claim as my invention:

1. In an automobile torpedo, the combination of adjoining separable fore and aft shell sections, a separable fluid conduit leading from the one to the other of said sections, one conduit part being secured to each shell section, a conduit-coupling head attached to each conduit part, and a rotatable connecting member engaging said heads, one of said shell sections being provided with an opening adjacent to said member, and said member being provided with a head engageable for continuous rotation by a tool inserted through said shell opening.

2. In an automobile torpedo, the combination of adjoining separable fore and aft shell sections, a separable fluid conduit leading from the one to the other of said sections, one conduit part being secured to each shell section, a conduit-coupling head attached to each conduit part, said heads being provided with registering openings one of which is threaded, and a threaded bolt in said openings and clamping said heads together, one of said shell sections being provided with an opening adjacent to said bolt, and said bolt being provided with a head engageable for continuous rotation by a tool inserted through said shell opening.

3. In an automobile torpedo, the combination of adjoining separable fore and aft shell sections, a bulkhead carried by the aft section, a fluid controlling valve carried by the fore shell section, said valves being provided with laterally projecting coöperating coupling heads forming also a fluid passageway between the valves, a rotatable connection member engaging said heads and clamping them together, said fore section being provided with an opening adjacent to said member, and said member being provided with a head engageable for continuous rotation by a tool inserted through said shell opening.

In testimony whereof I have hereunto set my hand.

HAROLD W. SHONNARD.

Witnesses:
HERMAN C. ENGELMAN,
GEO. V. JAMES.

Copies of this patent may be obtained for five cents each, by addressing the "Commissioner of Patents, Washington, D. C."